Patented Jan. 1, 1935

1,986,029

UNITED STATES PATENT OFFICE 1,986,029

PIGMENTS AND DISPERSION THEREOF

James D. Todd and Max Silverman, Chicago, Ill., assignors to The Sherwin-Williams Company, Cleveland, Ohio, a corporation of Ohio No Drawing. Application November 19, 1931, Serial No. 576,207

3 Claims. (Cl. 134—58)

This invention relates to the treatment of pigments. It has special reference to the manufacture of paint and paint pigments and to the production of oiled pigments.

Pigments, as originally formed in wet processes, are in finely divided form. It is essential, in the final form for the manufacture of paint ready for application, as by the painter's brush, or in other arts, that the pigments be in finely divided condition and uniformly dispersed throughout a carrier or vehicle.

In the paint industry, in the first treatment of the furnished pigments, for the purpose of arriving at the desired form, as in their manufacture, the pigments are necessarily mixed with water wherein they are formed or held in suspension. In some cases the pigments are added to the water. With the pigments thus uniformly dispersed throughout the volume of the mixture, the mixture is led to a suitable filter by means of which, so far as possible, water is removed therefrom. The residual plastic mass which results from this operation of course still contains considerable water, and that water must be eliminated, practically entirely, before the pigments can be successfully incorporated with an oil carrier or vehicle to form a paint. In the prevailing practice, the plastic mass from the filter press is subjected to heat in a kiln, for the purpose of evaporating the water, the mass emerging from the kiln in practically dry state, which is thereafter ground dry, and mixed dry into an oil. This procedure, however, changes the physical condition of the pigments and they are no longer in the finely divided state in which they originally existed and in which they are desired in the ultimate paint.

A practice in connection with printing inks is the kneading of a pulp color in a vehicle. A separation of water from the mixture occurs such that some water may be drawn off, but all the water is not so removed, nor is that practice, as heretofore known, applicable to wet pigments which are not preferentially wetted by oil. To effect removal of some of the residual portion, vacuum, with or without applied heat, is sometimes resorted to.

This invention improves the manufacture of paints, inks, and other materials containing dispersed pigments, by successfully dispersing the wet pigments in vehicles not miscible with water, such as oils, fats and waxes, with the liberation of the water. Because the process may be used with pigments which are not preferentially wetted by such materials, as well as with pigments which are preferentially wetted, the invention is applicable to an entire line of pigments in the manufacture of paints and other products.

It is one object of this invention to disperse pigments without incurring change in the finely divided state in which they fortuitously exist, as hereinbefore pointed out, when the process is commenced. This the present invention accomplishes as actual demonstration has shown. Accordingly, this invention obviates the necessity of drying all the pigment and of grinding the dry pigments, doing so by eliminating the step of kiln drying and introducing a new step, or steps, by means of which all or substantially all of the plastic mass from the filter press is maintained in finely divided particles while being relieved practically entirely of its water as it is being mixed with the initial oil carrier or vehicle in a thoroughly practicable and effective manner.

One object of the invention is the alteration of a wet pigment particle to create or increase in it a preference for a liquid vehicle other than water and immiscible with water.

Still another object of the invention is the incorporation of a wet paste of pigment having preference for a liquid vehicle into such a vehicle with the liberation or displacement of the water from the paste.

A particular object of the invention is the use of a viscous non-aqueous paste of dispersed pigment as a medium for dispersing the water from a watery paste of pigment, and for taking up the pigment freed from its water.

Various other and ancillary objects and advantages of the invention will become apparent from the following description of various examples of the invention which illustrate specifically its use in the paint industry.

The new step or steps referred to may be described as directly replacing the water of the pulp from the filter presses with pigment vehicle oils, such as hydrocarbons or vegetable oils, and simultaneously dispersing the pigments therein, all under such conditions and to such an extent as to produce high grade water-free oiled pigments ready for the usual thinning and use as a paint. This is much more simple and much less costly than the drying and grinding in the prevailing practices, and secures not only as good a product, but indeed a better one, because of the retained original fineness of the pigment.

The suspension of particles in liquid involves forces between the interfacial surfaces, and these forces in turn are dependent upon the substance at the surfaces. Certain pigments, especially those which are acid in character, such as iron blues, and chrome greens, and also any color which exists in a very finely divided state, have a much less affinity for oil than for water, and therefore tend to agglomerate when it is attempted to replace water in its paste by oil, as in the mixing process. In order to maintain such pigments against agglomeration, the surface character is altered so that they are easily wetted by the oil. Other pigments do not need such alteration of the surface. In both instances, the mixing of the pigments, with natural or altered surfaces, is conducted in a manner conducive to maintaining the finely divided form.

Pigments are usually of two types. One class may be a simple insoluble compound or precipitate, such as lead chromate, or a mixture of simple insoluble compounds, such as lithopone. The other class may be the lake colors or insoluble metallic salts of organic dyestuffs.

It is well known that protective colloids greatly aid the making and increase the stability of emulsions or suspensions. Compounds for this purpose are employed in making pigmented oils. Such compounds are by nature organosols, or materials, such as metallic soaps which are soluble in the oil vehicle. Use of the organosols places many limitations on the quality, the properties, and the pigment concentration of thick pigmented oils, so much so that they are not wholly desirable, or are practical only in small quantities for best results.

According to the present invention we treat the acid type of pigment which is not readily wetted by oil, with a polar compound. Such a compound is one acting as if it has molecules of elongated character, with distinctive functional properties at the ends of the molecule. They act in certain instances as if the molecules orient themselves in a uniform manner, presenting a surface, or interface at which similar ends of the molecule are alined, thus giving an interface with distinctive properties on one side. We have found that lead acetate, or basic lead acetate, appears to act as a polar compound and to function advantageously for acid pigments. The basic or lead end of the molecule is undoubtedly attracted to the pigment particle by its acidic character, thus alining the acetate ends of the molecules into a layer which is the presentable surface of the particle. The acetate end, being organic in structure and more like the oil, readily mixes with the oil molecules, or is wetted by them. Thus, the acidic particle, normally not wetted, or poorly wetted, by the oil is altered superficially so that it is wetted by the oil.

We prefer to add the polar compound to the water paste of the pigment so that the particles in their finely divided condition become superficially altered to retain the fine degree of subdivision. The lead acetate being soluble in water may be applied by the water solution as the wet particles are being ground in the oil. Thus larger particles may be broken while in the oil, and the smaller parts become superficially altered. On being wet by the oil they are easily carried off in the oil vehicle leaving behind the water which manifests itself as a separable layer.

Other pigments which are normally wetted by the oil sufficiently to maintain their fine subdivision under proper conditions, do not need the surface alteration by a polar compound. In such cases we find that the particles of the paste may be maintained in fine subdivision and be freed from water in the mixing process by having a sufficiently thick suspension. We have found that the mutual rubbing of the particles on each other is effective to break the particles into finer particles and to prevent agglomeration.

In accordance with the present invention oil and a wet paste of pigment particles which are by nature or by artifice preferentially wetted by oil, as between oil and water, are added to a thick paste of oil containing pigment already wetted by oil. The three ingredients are then kneaded or mixed, and as water separates it may be withdrawn. The use of a heavy oil-wet paste to receive a water-wet paste more effectively incorporates the pigment particles in oil and releases them from the water. The original oil-paste is called a "seed" mix and it may be prepared in numerous ways. It may be a portion of a batch made previously by the process of this invention. It may be a paste produced from mixing kiln-dried and ground pigments with oil, and this may be necessary or desirable in originally beginning manufacture by this invention. Such use of kiln dried pigments will result in a final product which has a percentage of particles derived by kiln drying and a percentage of particles derived from a paste. However, after the process is started a portion of any one batch may be used to mother the instant batch. The result will then be that kiln-dried particles are practically eliminated.

Without this invention the prior art practice dictates that one merely knead and mix the wet paste and the oil together until water separates. The oil and paste in such a process are relatively immiscible masses. The paste is too solid for the fluidity of the oil, and the two merely slop around together in a mixer with little tendency to become incorporated together. Using the present invention, the viscous paste, practically in the form of the ultimate product, lacks the fluidity which characterizes the oil. It offers a more solid mass which is capable in the mixing process of doing work on the water-wet paste. The oil required for the additional pigment is taken up readily by the body of heavy paste. The oil may be added initially, or from time to time, as incorporation of pigment in oil is effected. The addition of oil of course dilutes or thins the heavy seed, and according to the consistency desired for the seed the oil may be withheld or added. The heavier the oil paste or seed, the more effective it is to squeeze water from the wet paste. It is also effective to produce mutual rubbing of larger particles within the mixer so that they become disintegrated into smaller particles.

In practice we prefer to use about 100 parts of seed having a consistency comparable to that of a mixture of 80 parts of lemon yellow and 20 parts of linseed oil. To this we may add for example, approximately 10 parts of linseed oil, and approximately 40 parts of lemon yellow pigment associated with approximately as much water in the form of a wet paste. These quantities are subject to wide variation in practice. The mixing and kneading is continued until a separable quantity of water is released. This may be withdrawn. Then more oil and paste may be added and the process repeated. If the mixing is effected in a batch process, the batch at the end of mixing may be further mixed with application of heat, or heat and vacuum to remove residual water, not readily removable as a liquid. If the process is carried on in a continuous mixing apparatus the discharged material may be similarly treated by heat, or by heat and vacuum to remove residual water.

The seed may be used with pigments naturally preferential to oil, or artificially made so by addition agents. The following examples illustrate the invention more specifically.

Example I

| | Parts by weight |
|---|---|
| Chrome yellow (in paste form) | 80.0 dry content |
| Fatty acids of linseed oil | .5 |
| Linseed oil | 19.5 |

The fatty acid coats the particles as a polar compound either per se, or as an altered compound from a slight reaction with the lead in the pigment. The materials are ground in a thick paste in a dough mixer. When water separates it is drawn off. The final mixing may be effected with heat and vacuum to remove the residual water.

Example II

| Mix A | Parts by weight |
|---|---|
| Dry, ground, lemon yellow | 80 |
| Linseed oil | 20 |

This is well mixed in a mixer, but not to an ultimate fine division of the pigment.

| Mix B | Parts by weight |
|---|---|
| Lemon yellow (50% water) | 40 dry content |
| Linseed oil | 10 |

Mix B into A and mill. Water will break out of the mix, which should be poured off. More of Mix B may be added and the mixing continued. The released water should be removed. This may be repeated until so little water is released, that the final water requires heat and reduced pressure to remove it.

Example III

| | Parts by weight |
|---|---|
| Chinese blue (in paste form) | 30.0 dry content |
| Basic lead acetate | 0.5 dry content |
| Linseed oil, or castor oil | 69.5 dry content |

The above quantity, totalling 100 parts, may be added to a paste containing the same or nearly the same proportions of the same materials, and the process carried out as above described.

In Examples I and III the pigment illustrates the type which is preferably altered to create or to increase a preference for wetting by oil, rather than by water. Example II illustrates a pigment which has a sufficient natural property to be wet by oil so that water already wetting it will be replaced by oil.

By the present method it is possible to manufacture by one method a complete line of colors, involving different classes of pigments. The method is directly applicable to some pigments, while other pigments may be treated to adapt them for use in the process. The invention is not to be considered as limited to the alteration of some pigments for such adaptation, nor to any particular method of altering such pigments, although such phases are included and are contemplated as falling within the scope of the invention as defined by the appended claims.

The present invention has been described and illustrated specifically by reference to manufacture of paints, wherein it is particularly important to eliminate water. However, the invention is not to be considered as limited to this field. The pigments modified to render them highly preferentially wet by a liquid vehicle may be made and sold wet as a new product for subsequent incorporation, with or without other material, into other materials, such as hydrocarbons, fats, oils and waxes, for example, castor oil, fish oil, asphalt, the material sold under the trademark "Gilsonite", natural and synthetic resin varnishes, turpentine, paraffin, etc.

The so-called wetting property herein referred to is to be understood as being a relative property determined by the affinity of the particle and the ultimate vehicle. Some pigments may be preferentially wet by one such vehicle and not by another, or to a greater or less degree by one as compared to another.

We claim:

1. The method of incorporating pigments in oil which comprises making a watery paste of finely divided pigments, mixing said wet paste into a viscous paste of pigment already incorporated in oil, whereby water is liberated as a separable fluid, and removing said water.

2. The method of incorporating pigments in oil which comprises making a watery paste of finely divided pigments, mixing said wet paste and oil into a viscous paste of said pigment already incorporated in oil, whereby water is liberated as a separable fluid, and removing said water.

3. The method of incorporating pigments in oil which comprises making a watery paste of finely divided pigments, mixing said wet paste into a viscous paste of said pigment already incorporated in oil, whereby water is liberated as a separable fluid, and removing said water, mixing more oil and wet paste into said resulting viscous mass, removing liquid water released therefrom, and subsequently volatilizing residual water from the mass.

JAMES D. TODD.
MAX SILVERMAN.